US011720789B2

(12) United States Patent
Bagherinezhad et al.

(10) Patent No.: US 11,720,789 B2
(45) Date of Patent: Aug. 8, 2023

(54) FAST NEAREST NEIGHBOR SEARCH FOR OUTPUT GENERATION OF CONVOLUTIONAL NEURAL NETWORKS

(71) Applicant: Apple Inc., Cupertino, CA (US)

(72) Inventors: Hessam Bagherinezhad, Seattle, WA (US); Dmitry Belenko, Redmond, WA (US)

(73) Assignee: Apple Inc., Cupertino, CA (US)

( * ) Notice: Subject to any disclaimer, the term of this patent is extended or adjusted under 35 U.S.C. 154(b) by 605 days.

(21) Appl. No.: 16/672,352

(22) Filed: Nov. 1, 2019

(65) Prior Publication Data

US 2020/0387783 A1 Dec. 10, 2020

Related U.S. Application Data

(60) Provisional application No. 62/858,911, filed on Jun. 7, 2019.

(51) Int. Cl.
| | |
|---|---|
| G06F 16/00 | (2019.01) |
| G06N 3/08 | (2023.01) |
| G06F 17/16 | (2006.01) |
| G06F 16/903 | (2019.01) |
| G06N 3/04 | (2023.01) |
| G06F 40/30 | (2020.01) |

(52) U.S. Cl.
CPC ......... *G06N 3/08* (2013.01); *G06F 16/90335* (2019.01); *G06F 17/16* (2013.01); *G06F 40/30* (2020.01); *G06N 3/04* (2013.01)

(58) Field of Classification Search
CPC ...... G06N 3/08; G06N 3/04; G06F 16/90335; G06F 40/30; G06F 17/16
USPC .......................................................... 706/20
See application file for complete search history.

(56) References Cited

U.S. PATENT DOCUMENTS

2012/0233159 A1\* 9/2012 Datta ................ G06F 16/24575
707/E17.014

\* cited by examiner

*Primary Examiner* — Alexandria Y Bromell
(74) *Attorney, Agent, or Firm* — BakerHostetler (57) ABSTRACT

In one embodiment, a method includes receiving an input vector corresponding to a query at a neural network model comprising a plurality of layers, wherein the plurality of layers comprise a last layer associated with a mapping matrix, generating a binary matrix based on the mapping matrix, an identity matrix, and one or more Gaussian vectors, generating an integer vector based on the binary matrix and a binary vector associated with the input vector, identifying a plurality of indices corresponding to a plurality of top values of the integer vector for the integer vector, generating an output vector based on the input vector and a plurality of rows of the mapping matrix, wherein the plurality of rows is associated with the plurality of identified indices, respectively, and determining the query is associated with one or more classes based on the output vector.

20 Claims, 7 Drawing Sheets

FAST NEAREST NEIGHBOR SEARCH FOR OUTPUT GENERATION OF CONVOLUTIONAL NEURAL NETWORKS

PRIORITY

This application claims the benefit, under 35 U.S.C. § 119(e), of U.S. Provisional Patent Application No. 62/858,911, filed 7 Jun. 2019, which is incorporated herein by reference.

TECHNICAL FIELD

This disclosure generally relates to natural language processing, and in particular relates to machine-learning based natural language processing.

BACKGROUND

Machine learning (ML) is the study of algorithms and mathematical models that computer systems use to progressively improve their performance on a specific task. Machine learning algorithms build a mathematical model of sample data, known as "training data", in order to make predictions or decisions without being explicitly programmed to perform the task. Machine learning algorithms may be used in applications such as email filtering, detection of network intruders, and computer vision, where it is difficult to develop an algorithm of specific instructions for performing the task. Machine learning is closely related to computational statistics, which focuses on making predictions using computers. The study of mathematical optimization delivers methods, theory, and application domains to the field of machine learning. Data mining is a field of study within machine learning and focuses on exploratory data analysis through unsupervised learning. In its application across business problems, machine learning is also referred to as predictive analytics.

Object detection and identification/classification are important aspects of many systems. These functions are based on the processing and interpretation of images/videos and are used in many applications and settings involving image/video, object, and pattern recognition, typically as part of a decision process. Example applications include security, access control, identification/authentication, machine vision, artificial intelligence, engineering, manufacturing, robotics, systems control, autonomous vehicles, and other situations involving some form of object or pattern recognition, object detection, or automated decision-making based on an image or a video.

Natural language processing (NLP) is a subfield of computer science, information engineering, and artificial intelligence concerned with the interactions between computers and human (natural) languages, in particular how to program computers to process and analyze large amounts of natural language data. Challenges in natural language processing frequently involve speech recognition, natural language understanding, and natural language generation.

SUMMARY OF PARTICULAR EMBODIMENTS

In particular embodiments, a computing system may improve the efficiency of a deep learning classification model by leveraging a fast nearest-neighbor search algorithm. The deep learning classification model may be based on neural networks which include a plurality of layers. The last layer is typically a dense layer which maps vectors to the number of classes. The mapping may involve a full matrix-vector multiplication between the vectors and a mapping matrix. For some applications, the number of classes may be a large number, which leads to high computational complexity when performing the full matrix multiplication. Therefore, such computation may become a bottleneck in the classification model with respect to computing resources. As an example and not by way of limitation, such bottleneck is particularly problematic in natural-language processing (NLP) models (e.g. language modeling or machine translation) as these models usually need to classify a word/token from 30000 to 500000 classes. To solve the problem, the computing system may leverage a fast nearest-neighbor search algorithm in the last layer instead of the full matrix-vector multiplication, followed by identifying the top-k values of the resulted vector as the classes. The embodiments disclosed herein has been tested to be 3*faster than conventional matrix-vector multiplication in the last layer without any drop in the accuracy when applied to machine translation. Although this disclosure describes using particular algorithms for particular models in a particular manner, this disclosure contemplates using any suitable algorithm for any suitable model in any suitable manner.

In particular embodiments, the computing system may receive, at a neural network model comprising a plurality of layers, an input vector corresponding to a query. The plurality of layers may comprise a last layer associated with a mapping matrix. The computing system may then generate a binary matrix based on the mapping matrix, an identity matrix, and one or more Gaussian vectors. In particular embodiments, the computing system may generate an integer vector based on the binary matrix and a binary vector associated with the input vector. The computing system may then identify, for the integer vector, a plurality of indices corresponding to a plurality of top values of the integer vector. In particular embodiments, the computing system may generate an output vector based on the input vector and a plurality of rows of the mapping matrix. The plurality of rows may be associated with the plurality of identified indices, respectively. The computing system may further determine, based on the output vector, the query is associated with one or more classes.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a computing system may leverage machine-learning models to improve the efficiency and effectiveness of multimedia data analysis. Multimedia data analysis may include the analysis of any suitable multimedia data such as text, image, video, audio, etc. Multimedia data analysis may be associated with particular applications such as object detection/recognition in images/videos, object tracking in images/videos, event detection/recognition in images/videos, segmentation in images/videos, natural language processing, etc. In particular embodiments, the machine-learning models may be supervised, semi-supervised, or unsupervised. The machine-learning models may be based on regression learning, reinforcement learning, decision trees, random forest, support vector machines, neural networks, or any suitable learning algorithms. In particular embodiments, the computing system may use neural network-based machine-learning models for multimedia data analysis. As an example and not by way of limitation, the neural network-based models may comprise one or more of convolutional neural networks, long-short term memory units, or recurrent neural networks, or any combination thereof.

A neural network is a system of interconnected artificial "neurons" that exchange messages between each other. The connections have numeric weights that are tuned during the training process, so that a properly trained network will respond correctly when presented with an image or pattern to recognize. The network consists of multiple layers of feature-detecting "neurons". Each layer has many neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger function (for example, using a sigmoid response function). Deep neural networks (DNN) have shown significant improvements in several application domains including computer vision and speech recognition. In computer vision, a particular type of DNN, known as a Convolutional Neural Network (CNN), has demonstrated state-of-the-art results in image and video analysis.

A convolutional neural network (CNN) is a special case of the neural network described above. A CNN consists of one or more convolutional layers, often with a sub sampling layer, which are followed by one or more fully connected layers, as in a standard neural network. Convolutional neural networks (CNN) have been used for purposes of text/audio/image/video processing and have shown reliable results in different tasks that are useful in real world applications. Convolutional layers are useful for text/audio/image/video processing, as they extract features from these multimedia data relatively quickly and learn to extract the right features for the problem they are trained on (e.g., convolutional layers trained for classification may learn different filters (i.e., weights) than layers trained for regression, because different aspects or characteristics matter in each of those scenarios).

Figure 1:
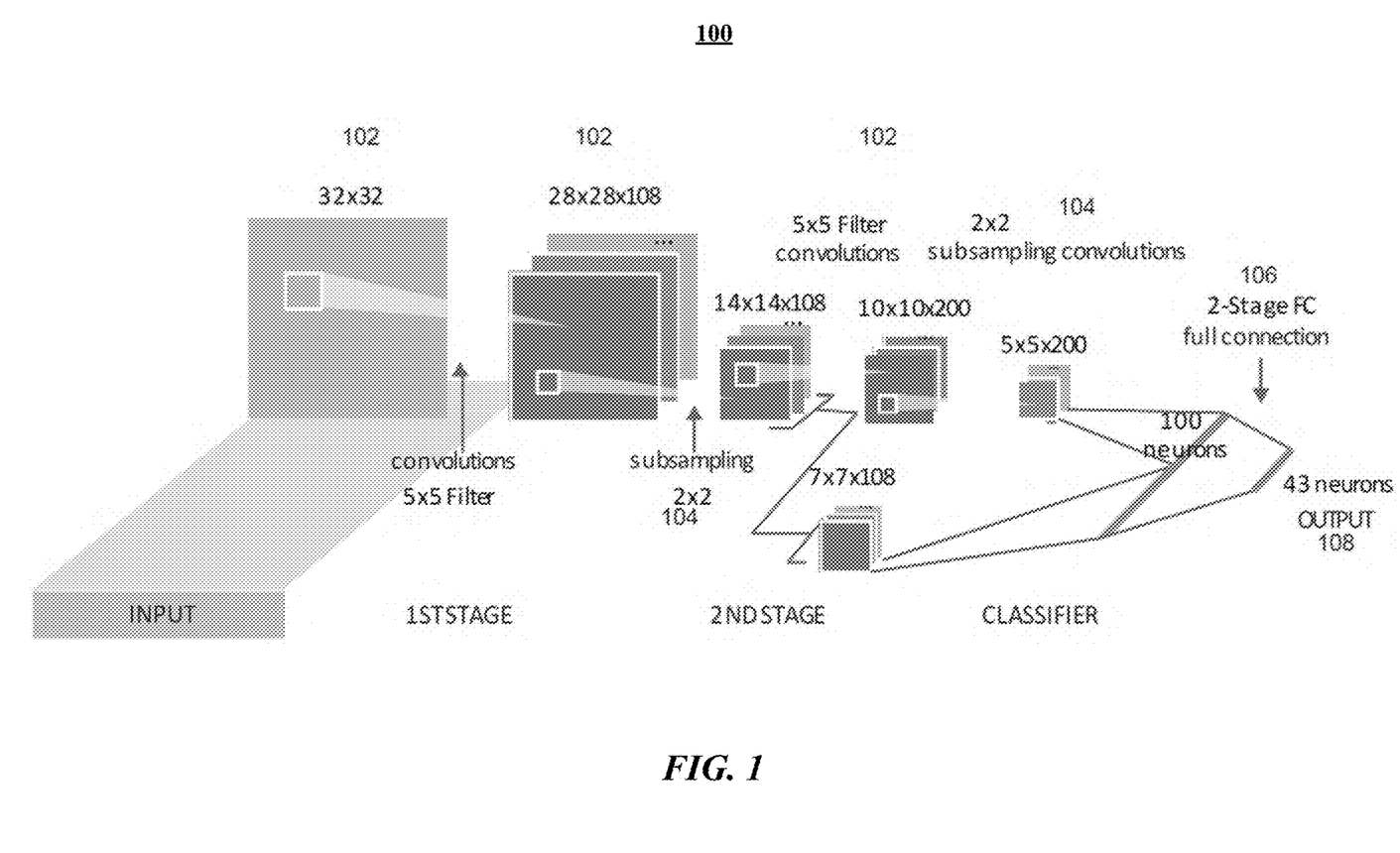
FIG. 1 illustrates an example architecture of a convolutional neural network (CNN) model.

FIG. 1 illustrates an example architecture of a convolutional neural network (CNN) model 100. FIG. 1 shows one or more convolutional stages 102, sub-sampling 104, and fully connected stages 106 leading to the production of an output 108. As shown in FIG. 1, input data (such as a digitized representation of an image) is provided to one or more convolutional stages 102 (represented as "1st Stage" and "2nd Stage" in the figure). The output of each convolutional stage is provided as an input to the following stage; in some cases, further subsampling operations 104 may be carried out. A final subsampling stage acts as a Classifier, with an output being passed to one or more fully connected stages 106 to produce an output 108.

In a CNN, convolution layers play the role of feature extractor, with the convolution filter kernel-weights being determined as part of the training process. Convolutional layers are able to extract the local features because they restrict the receptive fields of the hidden layers to be local. The weights of the convolutional layer used for feature extraction, as well as the fully connected layer used for classification, are determined during a training process.

By stacking multiple and different layers in a CNN, complex architectures may be built for different problems (e.g., classification). Four types of layers are most common: convolution layers, pooling/subsampling layers, non-linear layers, and fully connected layers. The convolution operation extracts different features of the input. The first convolution layer extracts low-level features such as edges, lines, and corners; higher-level layers extract higher-level features. The pooling/subsampling layer operates to reduce the resolution of the features and makes the features more robust against noise and distortion. There are two ways to do pooling: max pooling and average pooling. Neural networks in general (and CNNs in particular) rely on a non-linear "trigger" function to signal distinct identification of likely features on each hidden layer. CNNs may use a variety of specific functions, such as rectified linear units (ReLUs) and continuous trigger (non-linear) functions, to efficiently implement this non-linear triggering function. Fully connected layers are often used as the final layers of a CNN. These layers mathematically sum a weighting of the previous layer of features, indicating the precise mix of factors to determine a specific target output result. In case of a fully connected layer, all of the elements of all the features of the previous layer are used in the calculation of each element of each output feature. The final layers decode the network output and are determined by the task. As an example and not by way of limitation, for image classification, a set of probabilities is output using a classifier where the argmax is the most likely label for the input image. In object detection, class probabilities, bounding box coordinates, and their size are output.

In particular embodiments, the computing system may use a compressed CNN model which may be suitable for a computing platform with low power and low memory. As an example and not by way of limitation, the computing platform may comprise a field-programmable gate array (FPGA). The compressed CNN model may be suitable for smaller devices such as cell/smart phones, tablet computing devices, embedded electronic devices, smart wearable devices in virtual reality and augmented reality, etc. In particular embodiments, the computing system may integrate fusion and quantization when training the compressed CNN model. In particular embodiments, the computing system may perform quantization for both the convolutional layers and the batch normalization layers of a CNN model. For a convolutional layer, the computing system may quantize the floating-point input of this layer and the relevant weights/parameters to a low-bit (e.g., 8 bits or less) fixed-point number. For a batch normalization layer, the computing system may normalize input data based on specific means and variances which are tied to particular parameters and then similarly quantize the normalized data to a low-bit fixed-point number. In addition, the computing system may fuse the quantized convolution with a scaling factor associated with the batch normalization. The computing system may further quantize the fusion result to complete the compressed CNN model.

In particular embodiments, the computing system may use a binarized CNN model which may be computationally efficient for implementing convolutional operations. The computing system may perform one or more binary convolutions between a binarized input and binarized weights to generate the output corresponding to the particular task. In binary convolution, both weights and input activation space into binary (+1 or −1). To accelerate training time and to improve training accuracy, batch normalization may normalize input batches to have zero mean and unit variance. During training time, several constants for multiplication and biases may be learned. Then, at inference time, these constants may be folded into a simpler algebraic expression resulting in a fused-multiply-and-add per input value. In particular embodiments, the binarized CNN model may be based on binarization. Binarization may extract the sign of a real-valued input and packs it into a bitarray. Values greater than 0 are represented as "0b1", else it is "0b0". As an example and not by way of limitation, the input may comprise a plurality of values. Accordingly, binarizing the input may comprise extracting, for each of the plurality of values, a sign associated with the value, and packing, for each of the plurality of values, the extracted sign into a bitarray.

Figure 2:
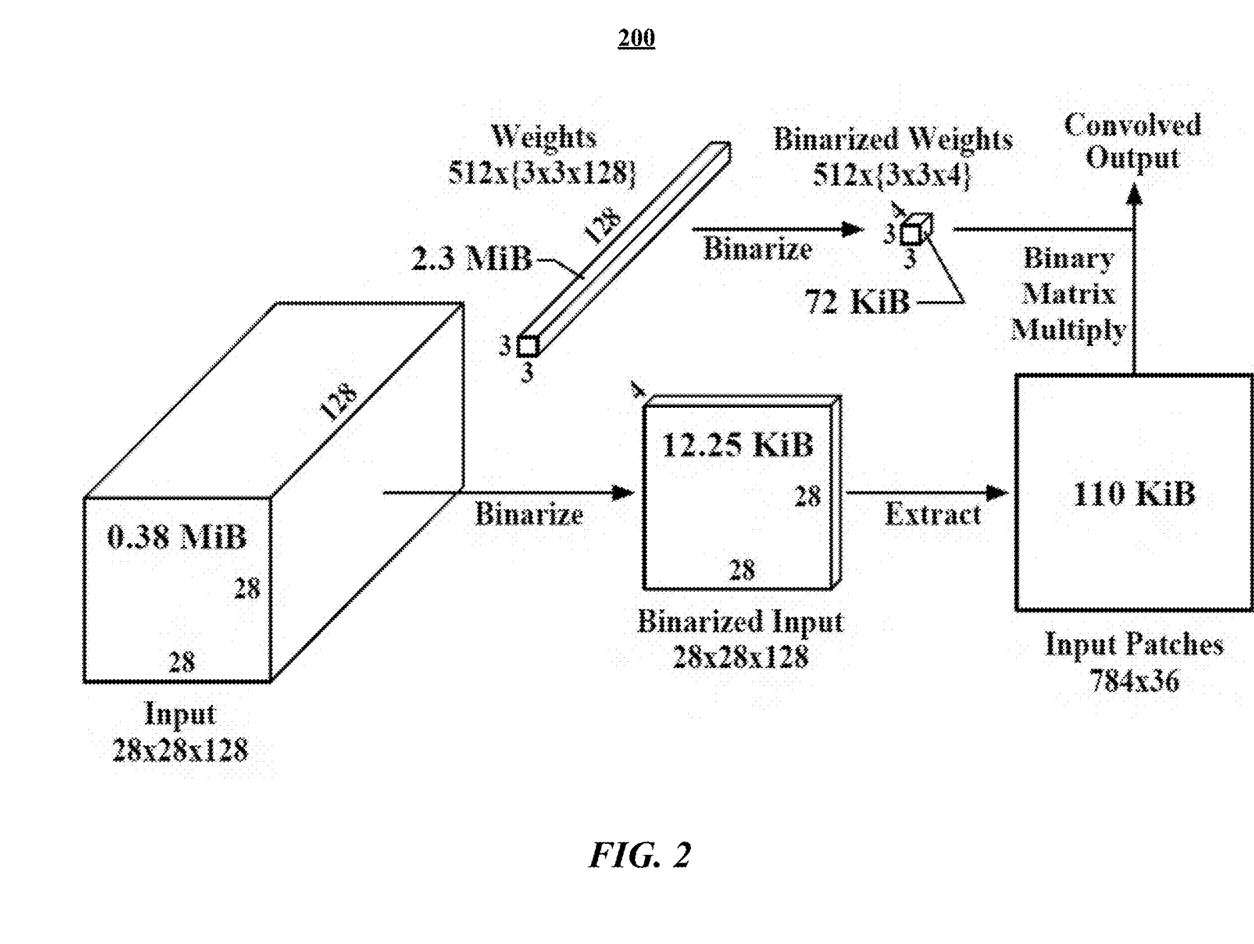
FIG. 2 illustrates an example visualization of a convolution layer in a binarized CNN model.

FIG. 2 illustrates an example visualization of a convolution layer in a binarized CNN model. As an example and not by way of limitation, FIG. 2 shows that a convolution layer of size 28×28×128 with 512 output filters and a filter size of 3. Mebibyte (MiB) is a unit of measurement used in computer data storage. The prefix mebi comes from the binary system of data measurement that is based on powers of two. A mebibyte equals 220 or 1,048,576 bytes. Most of the memory savings may occur at the binarization step where the channel dimension in both input and weights are shrunk by a factor of 32. Binary convolution may use significantly less memory while improving performance. The data type size is 32 bits and all rectangular parallelepipeds are drawn in proportion to each other with an x:y:z ratio of 2:2:1.

In particular embodiments, the computing system may store a machine-learning model in a binary inference engine. The computing system may further combine both the binary inference engine and its associated model data in a single module, such that the entire engine/model are self-contained in a single module. In particular embodiments, the single module may be stored as a particular file comprising one or more of a dynamic link library (dll) file or an extended binary (xb) file. A dll/xb file may be used for holding multiple codes and procedures. As an example and not by way of limitation, a user may use an application running on a client device or a computer attached to a video camera and speaker. The application may dynamically link to an xb file. The user may use the application to classify a scene with humans in it. With the "people_detector.xb" file dynamically loaded at runtime, the application may output a wave file through the speaker that says "person." The user may further use the application to classify the emotional state of the detected person. Without recompiling the application, the computing system may swap out "people_detector.xb" file with "emotion_detector.xb" on a disk, re-launch the application, and the speaker may say "happy" or "sad." In particular embodiments, the computing system may combine the binary inference engine and the model data using a linker. As a result, at runtime the computing system may have the capability to self-extract (to memory or temporary storage) the required model (e.g., parameters, etc.). The computing system may further construct a machine-learning architecture based on declarative data in the memory or in the data portion of the particular file (e.g., xb file). In particular embodiments, a single particular file may have multiple binary inference engines. Accordingly, the computing system may enumerate them via one or more application programming interfaces (APIs). In particular embodiments, the computing system may assist users to solve a plurality of tasks efficiently and effectively by integrating machine-learning models and their relevant model data.

In particular embodiments, a computing system may improve the efficiency of a deep learning classification model by leveraging a fast nearest-neighbor search algorithm. The deep learning classification model may be based on neural networks which include a plurality of layers. The last layer is typically a dense layer which maps vectors to the number of classes. The mapping may involve a full matrix-vector multiplication between the vectors and a mapping matrix. For some applications, the number of classes may be a large number, which leads to high computational complexity when performing the full matrix multiplication. Therefore, such computation may become a bottleneck in the classification model with respect to computing resources. As an example and not by way of limitation, such bottleneck is particularly problematic in natural-language processing (NLP) models (e.g. language modeling or machine translation) as these models usually need to classify a word/token from 30000 to 500000 classes. To solve the problem, the computing system may leverage a fast nearest-neighbor search algorithm in the last layer instead of the full matrix-vector multiplication, followed by identifying the top-k values of the resulted vector as the classes. The embodiments disclosed herein has been tested to be 3*faster than conventional matrix-vector multiplication in the last layer without any drop in the accuracy when applied to machine translation. Although this disclosure describes using particular algorithms for particular models in a particular manner, this disclosure contemplates using any suitable algorithm for any suitable model in any suitable manner.

In particular embodiments, the computing system may receive, at a neural network model comprising a plurality of layers, an input vector corresponding to a query. The plurality of layers may comprise a last layer associated with a mapping matrix. The computing system may then generate a binary matrix based on the mapping matrix, an identity matrix, and one or more Gaussian vectors. In particular embodiments, the computing system may generate an integer vector based on the binary matrix and a binary vector associated with the input vector. The computing system may then identify, for the integer vector, a plurality of indices corresponding to a plurality of top values of the integer vector. In particular embodiments, the computing system may generate an output vector based on the input vector and a plurality of rows of the mapping matrix. The plurality of rows may be associated with the plurality of identified indices, respectively. The computing system may further determine, based on the output vector, the query is associated with one or more classes.

Convolutional neural networks are an effective tool for many applications such as natural language processing (NLP). A convolutional neural network (CNN) may comprise a plurality of layers. The last layer in a CNN-based classification model is typically a dense layer. The last layer may map a vector to a number of classes. Let v denote the vector then $v \in \mathbb{R}^d$, where d indicates the dimension of the vector. As an example and not by way of limitation, the dimension of the vector may be between 256 and 1024. In particular embodiments, the last layer may correspond to a mapping matrix denoted by $M \in \mathbb{R}^{d \times C}$, where C indicates the number of the classes. Accordingly, the mapping may correspond to a matrix-vector multiplication between the mapping matrix and the vector. The matrix-vector multiplication may result in an output vector. Let s denote the output vector, then s=Mv. For some applications, the number of classes may be a very large number. As a result, the mapping of the last layer, i.e., the matrix-vector multiplication may become a bottleneck in the classification model. As an example and not by way of limitation, in NLP models where the goal is to classify a word/token, the number of classes may be up to 30000 to 500000.

In particular embodiments, the computing system may use a fast nearest-neighbor search algorithm in the last layer instead of a full matrix-vector multiplication to solve the aforementioned bottleneck. The idea is that in the last layer it may be unnecessary to calculate the confidence scores of all of the classes, which may be further used to classify the input vector. The computing system may only need to identify the top-k values of the output vector. As an example and not by way of limitation, k may be 1 or 5, depending on the application. In other words, the computing system do not need all the C values in the s=Mv vector but only the indices for the top-k values in s. In particular embodiments, identifying these indices means finding the top-k rows in the mapping matrix M that has the maximum dot product with the input vector v.

Finding these top-k rows in the mapping matrix M may be achieved by conventional nearest-neighbor search algorithms. However, conventional nearest-neighbor search algorithms may be not effective for a CNN-based classification model because they are either slower than a full matrix-vector multiplication (e.g., accurate tree-based methods) or not accurate enough for the CNN-based classification model to use (e.g., LSH-based methods). As a result, the embodiments disclosed herein present a novel fast nearest-neighbor search algorithm.

Figure 3:
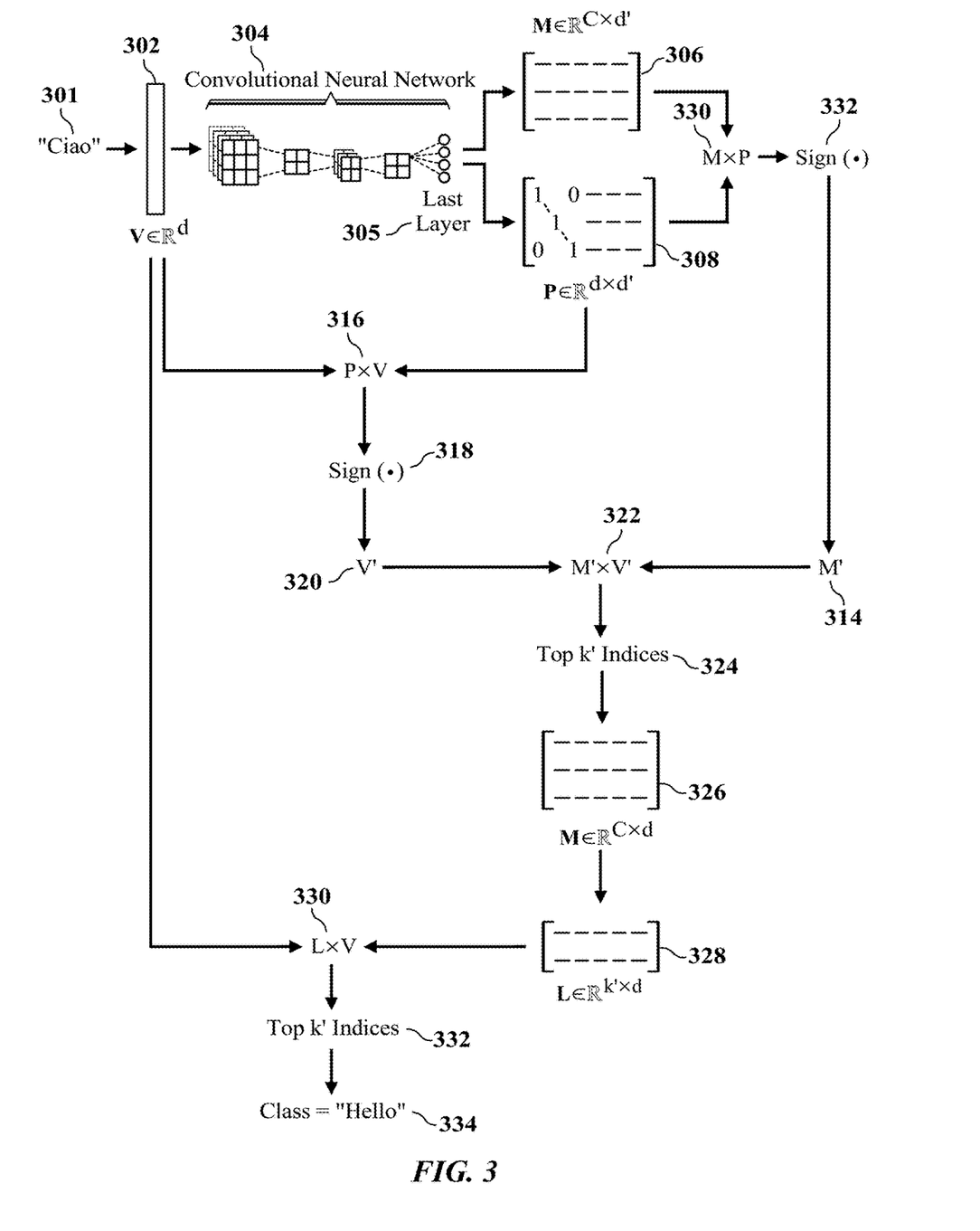
FIG. 3 illustrates an example diagram flow of using fast nearest neighbor search in a neural network model.

FIG. 3 illustrates an example diagram flow of using fast nearest neighbor search in a neural network model. As an example and not by way of limitation, the computing system may need to translate a query which is an Italian word "Ciao" 101 to English. In particular embodiments, the computing system may use the following steps to implement the fast nearest-neighbor search algorithm. As shown in FIG. 3, the computing system may first generate an input vector 302 for the word "Ciao" 301. The computing system may then process the input vector 302 by a convolutional neural network 304. The convolution neural network 304 may comprise a last layer 305. As shown in FIG. 3, the last layer 305 may correspond to a mapping matrix 306.

In particular embodiments, the computing system may generate an expansion matrix $P \in \mathbb{R}^{d \times d'}$. In particular embodiments, the expansion matrix may be associated with a hyper-parameter, namely, d. The hyper-parameter may have a larger dimension than the dimension of the input vector, i.e., d'>d. In particular embodiments, the hyper-parameter may be determined based on a trade-off between speed and accuracy of the neural network model. In other words, it should enable the model to have reasonable accuracy while achieving high speed. In alternative embodiments, the determination may be based on an analysis of the dimension of the hyper-parameter to find the right balance between the dimension and the computation efficiency. As an example and not by way of limitation, making d' larger may enable the selection of fewer weights from the matrix of the dot product between the mapping matrix and the input vector. In particular embodiments, the expansion matrix P may be constructed by concatenating the identity matrix and the one or more Gaussian vectors. To be more specific, the first d columns of P may comprise an identity matrix of size d×d. The rest d'−d columns of P may be randomly generated Gaussian vectors. For example, FIG. 3 shows an expansion matrix 308 comprising an identity matrix and Gaussian vectors.

In particular embodiments, the computing system may generate a binary matrix based on the mapping matrix and the expansion matrix. The generation may comprise multiplying the mapping matrix with the expansion matrix and applying a sign operation on the multiplication result, which may be formulated as M'=sign(MP). In particular embodiments, each element of the binary matrix M' may be either −1 or +1 and $M' \in \mathbb{R}^{C \times d'}$. The binary matrix M' may be a binary approximate of the mapping matrix M. That is, each row of matrix M' may be a binary vector of a higher dimension in $-1, +1^{d'}$, which is an approximation of the corresponding real-valued row in $\mathbb{R}^d$. As shown in FIG. 3, the computing system may perform a multiplication 310 between the mapping matrix 306 and the expansion matrix 308. The computing system may further perform a sign operation 312 on the multiplication result, which may result in the binary matrix 314. In alternative embodiments, generating the binary matrix may be based on copying values from the mapping matrix M, generating d'−d columns of random values, and concatenating the copied values and the generated d'−d columns of random values to form the binary matrix. In particular embodiments, the random values may be generated based on the input vector. As a result, the identity matrix, further the expansion matrix, may not be needed.

In particular embodiments, the computing system may generate a binary vector for the input vector. In particular embodiments, generating the binary vector may comprise multiplying the input vector with the expansion matrix and applying a sign operation on the multiplication result.

Denote the binary vector as v' then v'=sign(Pv). The binary vector v'∈-1, +1$^{d'}$ may be a binary approximate of the original real-valued input vector v. As shown in FIG. 3, the computing system may perform a multiplication 316 between the input vector 302 and the expansion matrix 308. The computing system may further apply a sign operation 318 on the multiplication result, which may result in the binary vector 320. In alternative embodiments, generating the binary vector may be based on the input vector and a machine-learning model. The machine-learning model may be trained based on a plurality of training data. The plurality of training data may comprise at least a number of elements retrieved from dot products between mapping matrices and input vectors obtained in historical classification tasks.

In particular embodiments, the computing system may then generate an integer vector. Generating the integer vector may comprise multiplying the binary matrix with the binary vector. Denote the integer vector as s' then s'=M'v' with a dimension of C. As shown in FIG. 3, the computing system may perform a multiplication 322 between the binary matrix 314 and the binary vector 320. In particular embodiments, the computing system may further identify a plurality of indices corresponding to a plurality of top values of the integer vector.

In particular embodiments, the computing system may implement a fast histogram-based sorting algorithm to find the top values of the integer vector if the dimension of the integer vector is remarkably large. The computing system may be able to use such sorting algorithm if it is clear how many distinct values will be present in the output after the binary dot product between the binary matrix and the binary vector. As an example and not by way of limitation, if the dimension of the integer vector is 1,024, there can only be 1,024 values. After the binary dot product between the binary matrix and the binary vector is computed, the computing system may scan the output and compute the histogram. The computing system may then find a threshold, based on which the computing system may further select the output values from the integer vector.

In alternative embodiments, the computing system use an approximate algorithm to find the top values of the integer vector. In particular embodiments, a number of the plurality of top values of the binary vector may be determined based on a trade-off between speed and accuracy of the neural network model. Denote the number of the plurality of top values as k' then k<k'<C. As shown in FIG. 3, the computing system may further find the top k' indices 324 of the integer vector. In particular embodiments, as k' may be remarkably larger than k, i.e., k'>>k. A guidance of determining k' may be that k' should be large enough so that the true top-k vectors in M are amongst the top-k' vectors in the binary space. Since the computation of s'=M'v' is a binary matrix-vector multiplication, it may be much faster than the original matrix-vector multiplication between the mapping matrix M and the input vector v. However, the dimension of the current binary matrix-vector multiplication is larger (i.e., d'>d). Hence, as discussed before, d' may be a hyperparameter that needs to be determined based on the speed/accuracy trade-off In particular embodiments, d' may be determined in consideration of balancing the cost of sorting the binary dot product and speeding up the whole operation. As an example and not by way of limitation, the computing system may use binary search or grid search to determine d'.

In alternative embodiments, the computing system may use signed bits to replace the aforementioned sign operation, i.e., M'=sign(MP) and v'=sign(Pv). As a result, each of the values of M' and v' may comprise 0 or 1 instead of −1 or +1. The computing system may further use Hemming distance to replace the binary dot product between M' and v' when calculating the integer vector s'.

In particular embodiments, the computing system may then generate the output vector. The generation may comprise generating a compression matrix based on the plurality of rows of the mapping matrix and multiplying the input vector with the compression matrix. The compression matrix may be considered as a matrix with size smaller than the mapping matrix. The computing system may index the top k' rows of the mapping matrix M to get the compression matrix, denoted as L∈ℝ$^{k' \times d}$. As shown in FIG. 3, the computing system may perform an operation 326 on the mapping matrix 306 which comprises indexing the top k' rows of the mapping matrix 306. As a result, the computing system may obtain the compression matrix 328. In particular embodiments, the output vector may be then computed by a matrix-vector multiplication between the input vector v and the compression matrix L. As indicated in FIG. 3, a multiplication 330 is performed between the input vector 302 and the compression matrix 328.

In particular embodiments, determining the query is associated with the one or more classes may comprise identifying one or more indices corresponding to one or more top values of the output vector and identifying the one or more classes corresponding to the identified indices, respectively. To be more specific, the computing system may pick the top k indices of the output vector and select these rows as the most possible classes for the query. As indicated in FIG. 3, the computing system may first identify the top k' indices 332 of the output integer. As an example and not by way of limitation, k' may be 1 and the top 1 index of the output integer may correspond to the class of "Hello" 334, which is the English translation of the Italian word "Ciao" 301.

In particular embodiments, the fast nearest-neighbor search algorithm was implemented in the application of neural machine translation as an experiment to test its performance. In particular embodiments, a conventional CNN model was used where the last layer of the conventional CNN model was replaced by the fast nearest-neighbor search algorithm. The experiments show that without the fast nearest-neighbor search algorithm, the dense matrix-vector multiplication at the last layer of the conventional CNN model may cost approximately 30% to 50% of the total computation time of the conventional CNN model, depending on the length of sentences that need to be translated. By contrast, the fast nearest-neighbor search algorithm may improve the computational efficiency with a 3× speedup without any drop in the accuracy.

Figure 4:
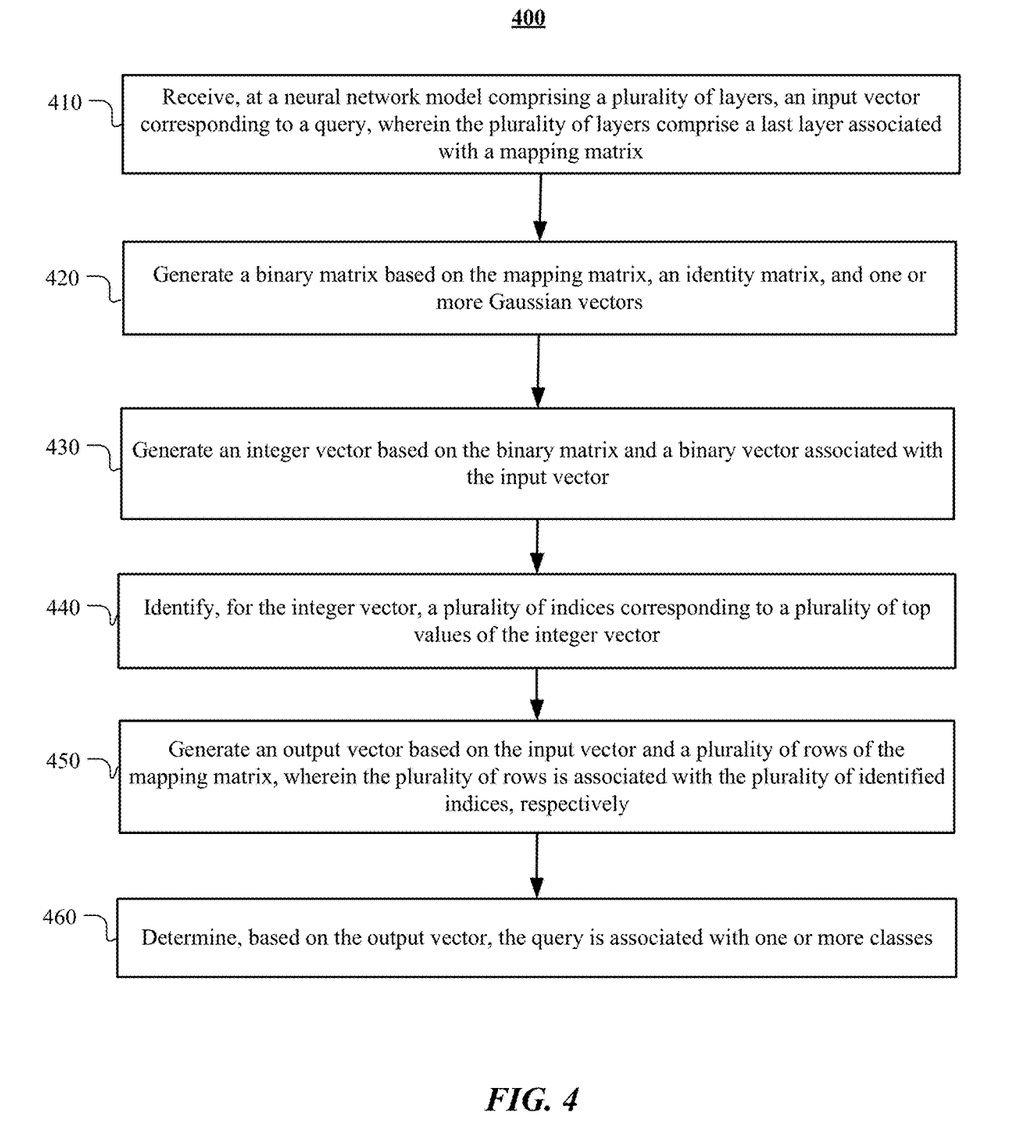
FIG. 4 illustrates an example method for fast nearest neighbor search in a neural network model.

FIG. 4 illustrates an example method 400 for fast nearest neighbor search in a neural network model. The method may begin at step 410, where the computing system may receive, at a neural network model comprising a plurality of layers, an input vector corresponding to a query, wherein the plurality of layers comprise a last layer associated with a mapping matrix. At step 420, the computing system may generate a binary matrix based on the mapping matrix, an identity matrix, and one or more Gaussian vectors. At step 430, the computing system may generate an integer vector based on the binary matrix and a binary vector associated with the input vector. At step 440, the computing system may identify, for the integer vector, a plurality of indices corresponding to a plurality of top values of the integer vector. At step 450, the computing system may generate an output vector based on the input vector and a plurality of rows of the mapping matrix, wherein the plurality of rows is associated with the plurality of identified indices, respectively. At step 460, the computing system may determine, based on the output vector, the query is associated with one or more classes. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for fast nearest neighbor search in a neural network model including the particular steps of the method of FIG. 4, this disclosure contemplates any suitable method for fast nearest neighbor search in a neural network model including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
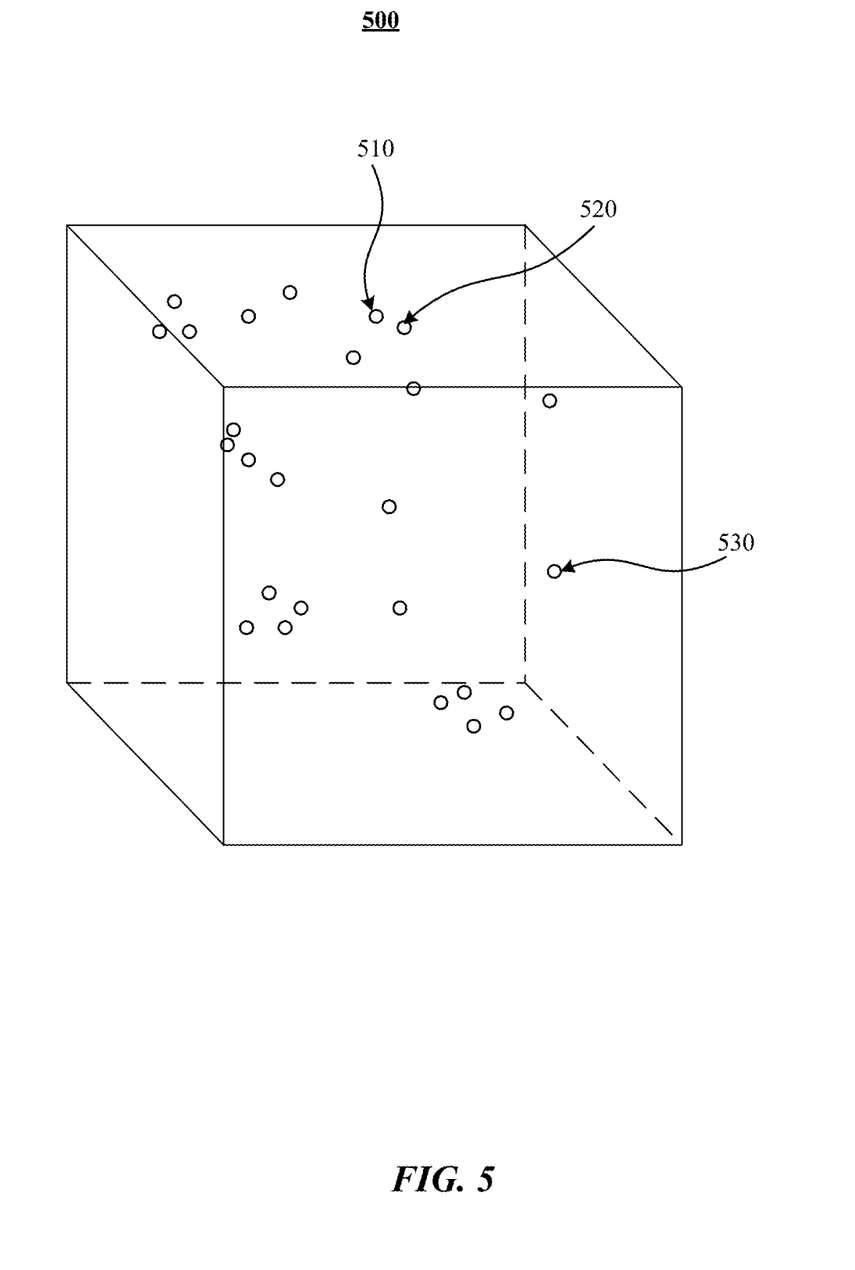
FIG. 5 illustrates an example view of an embedding space.

FIG. 5 illustrates an example view of a vector space 500. In particular embodiments, an object or an n-gram may be represented in a d-dimensional vector space, where d denotes any suitable number of dimensions. Although the vector space 500 is illustrated as a three-dimensional space, this is for illustrative purposes only, as the vector space 500 may be of any suitable dimension. In particular embodiments, an n-gram may be represented in the vector space 500 as a vector referred to as a term embedding. Each vector may comprise coordinates corresponding to a particular point in the vector space 500 (i.e., the terminal point of the vector). As an example and not by way of limitation, vectors 510, 520, and 530 may be represented as points in the vector space 500, as illustrated in FIG. 5. An n-gram may be mapped to a respective vector representation. As an example and not by way of limitation, n-grams $t_1$ and $t_2$ may be mapped to vectors $\vec{v_1}$ and $\vec{v_2}$ in the vector space 500, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 500. In particular embodiments, an n-gram may be mapped to a vector representation in the vector space 500 by using a machine leaning model (e.g., a neural network). The machine learning model may have been trained using a sequence of training data (e.g., a corpus of objects each comprising n-grams).

In particular embodiments, an object may be represented in the vector space 500 as a vector referred to as a feature vector or an object embedding. As an example and not by way of limitation, objects $e_1$ and $e_2$ may be mapped to vectors $\vec{v_1}$ and $\vec{v_2}$ in the vector space 500, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the computing system may calculate a similarity metric of vectors in vector space 500. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 500. As an example and not by way of limitation, vector 510 and vector 520 may correspond to objects that are more similar to one another than the objects corresponding to vector 510 and vector 530, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Figure 6:
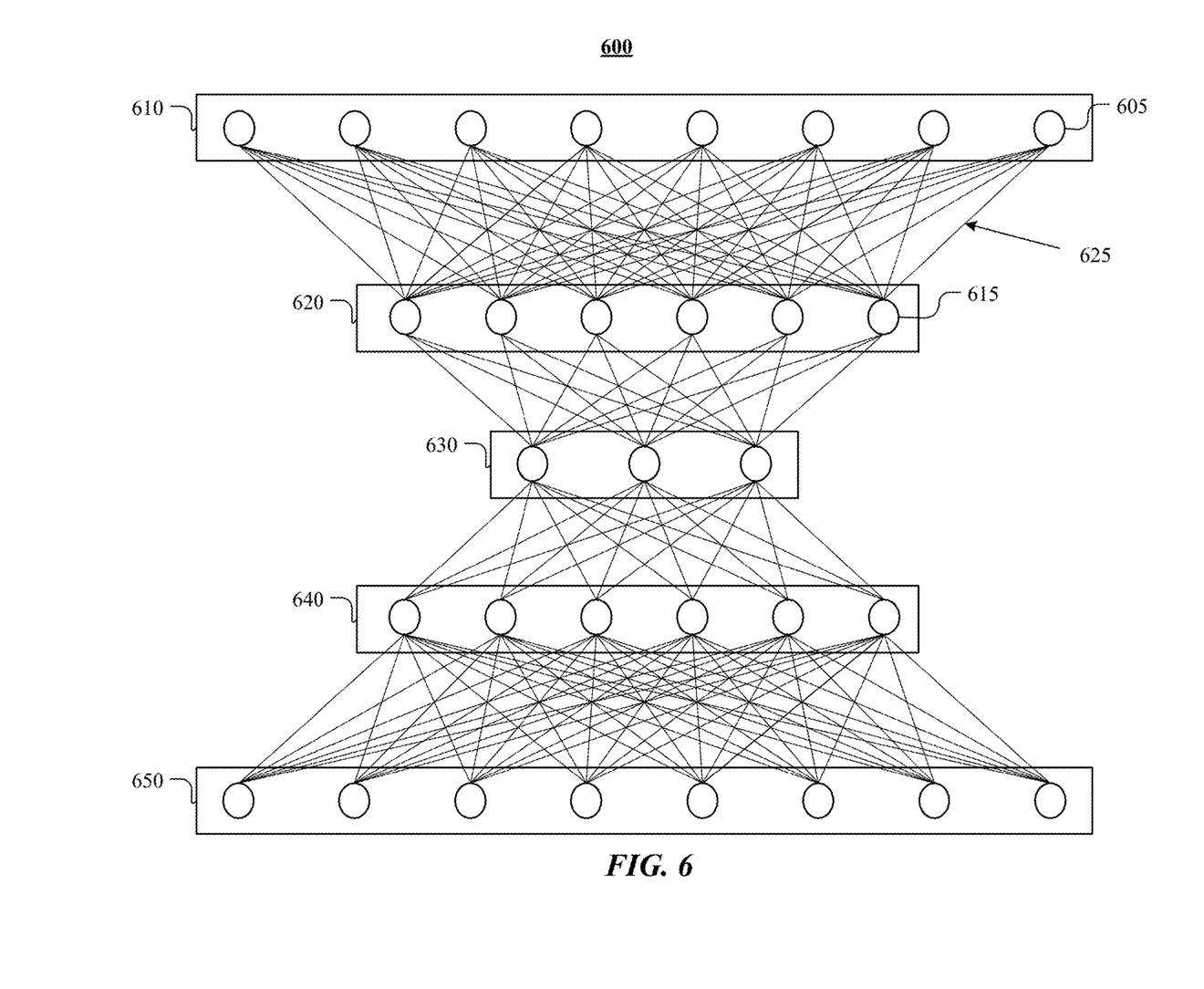
FIG. 6 illustrates an example artificial neural network.

FIG. 6 illustrates an example artificial neural network ("ANN") 600. In particular embodiments, an ANN may refer to a computational model comprising one or more nodes. Example ANN 600 may comprise an input layer 610, hidden layers 620, 630, 640, and an output layer 650. Each layer of the ANN 600 may comprise one or more nodes, such as a node 605 or a node 615. In particular embodiments, each node of an ANN may be connected to another node of the ANN. As an example and not by way of limitation, each node of the input layer 610 may be connected to one of more nodes of the hidden layer 620. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 6 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 6 depicts a connection between each node of the input layer 610 and each node of the hidden layer 620, one or more nodes of the input layer 610 may not be connected to one or more nodes of the hidden layer 620.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 620 may comprise the output of one or more nodes of the input layer 610. As another example and not by way of limitation, the input to each node of the output layer 650 may comprise the output of one or more nodes of the hidden layer 640. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 625 between the node 605 and the node 615 may have a weighting coefficient of 0.4, which may indicate that 0.4 multiplied by the output of the node 605 is used as an input to the node 615. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 600 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distance between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Figure 7:
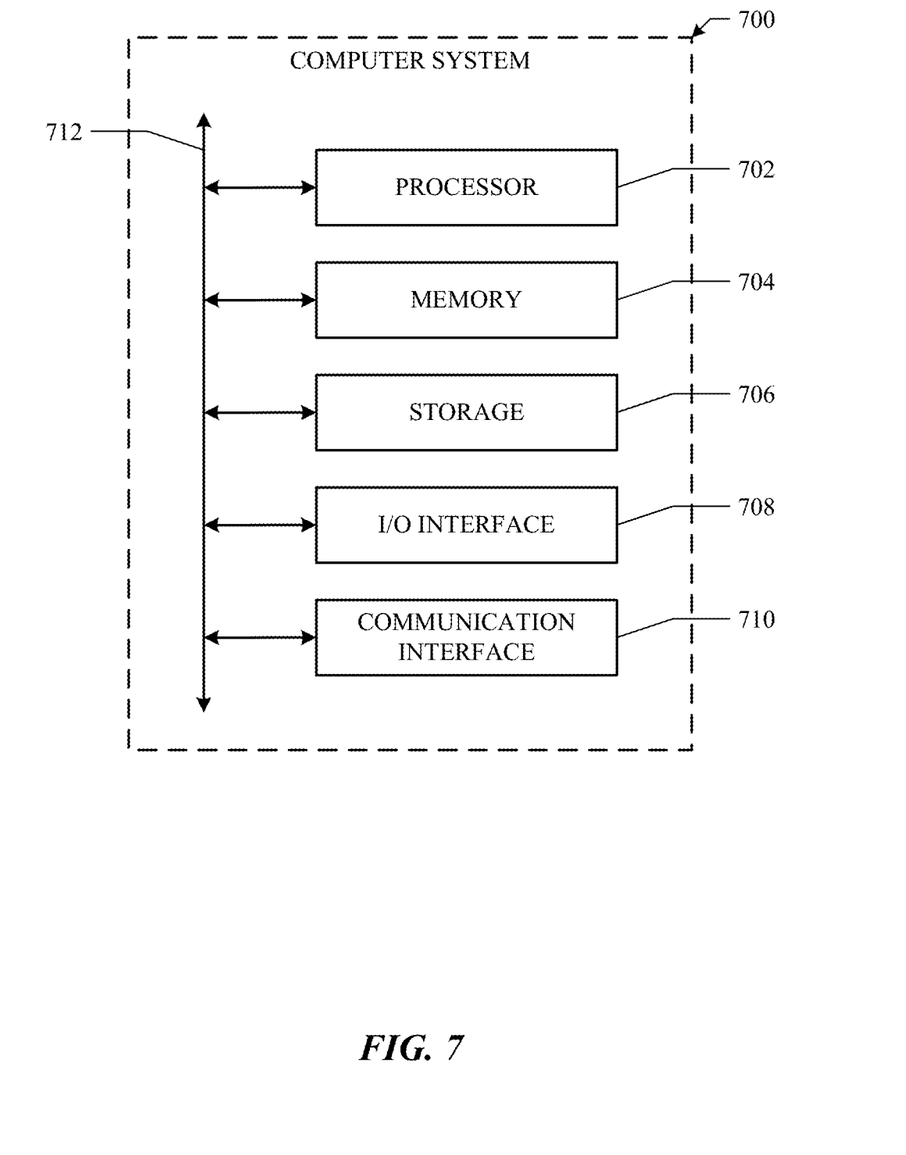
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving, at a neural network model comprising a plurality of layers, an input vector corresponding to a data item, wherein the plurality of layers comprise a last-layer associated with a mapping matrix;
   generating a binary matrix based on the mapping matrix;
   generating an integer vector based on the binary matrix and a binary vector associated with the input vector;
   identifying, for the integer vector, a plurality of indices corresponding to a plurality of top values of the integer vector;
   generating an output vector based on the input vector and a plurality of rows of the mapping matrix, wherein the plurality of rows is associated with the plurality of identified indices, respectively; and determining, based on the output vector, that the data item is associated with one or more classes.

2. The method of claim 1, wherein the binary matrix is further generated based on an identity matrix and one or more Gaussian vectors, and the method further comprising:
generating an expansion matrix by concatenating the identity matrix and the one or more Gaussian vectors.

3. The method of claim 2, wherein the expansion matrix is associated with a hyper parameter, the hyper parameter being determined based on a trade-off between speed and accuracy of the neural network model.

4. The method of claim 2, wherein generating the binary matrix comprises:
multiplying the mapping matrix with the expansion matrix; and
applying a sign operation on the multiplication result.

5. The method of claim 2, wherein the binary vector is generated by:
multiplying the input vector with the expansion matrix; and
applying a sign operation on the multiplication result.

6. The method of claim 1, wherein generating the integer vector comprises:
multiplying the binary matrix with the binary vector.

7. The method of claim 1, wherein a number of the plurality of top values of the binary vector is determined based on a trade-off between speed and accuracy of the neural network model.

8. The method of claim 1, wherein generating the output vector comprises:
generating a compression matrix based on the plurality of rows of the mapping matrix; and
multiplying the input vector with the compression matrix.

9. The method of claim 1, wherein determining the data item is associated with the one or more classes comprises:
identifying one or more indices corresponding to one or more top values of the output vector; and
identifying the one or more classes corresponding to the identified indices, respectively.

10. The method of claim 1, wherein the binary matrix is further generated based on one or more Gaussian vectors that are randomly generated.

11. The method of claim 1, wherein the data item comprises one or more of a text, an audio clip, an image, or a video.

12. One or more computer-readable non-transitory storage media embodying software that is operable when executed to:
receive, at a neural network model comprising a plurality of layers, an input vector corresponding to a data item, wherein the plurality of layers comprise a layer associated with a mapping matrix;
generate a binary matrix based on the mapping matrix, an identity matrix, and one or more Gaussian vectors;
generate an output vector based on the input vector and a plurality of rows of the mapping matrix; and
determine, based on the output vector, that the data item is associated with one or more classes.

13. The media of claim 12, wherein the software is further operable when executed to:
generate an expansion matrix by concatenating the identity matrix and the one or more Gaussian vectors.

14. The media of claim 13, wherein the expansion matrix is associated with a hyper parameter, the hyper parameter being determined based on a trade-off between speed and accuracy of the neural network model.

15. The media of claim 13, wherein generating the binary matrix comprises:
multiplying the mapping matrix with the expansion matrix; and
applying a sign operation on the multiplication result.

16. The media of claim 13, wherein a binary vector associated with the input vector is generated by:
multiplying the input vector with the expansion matrix; and
applying a sign operation on the multiplication result.

17. A system comprising:
one or more processors; and
a non-transitory memory coupled to the processors comprising instructions executable by the processors, the processors operable when executing the instructions to:
receive, at a neural network model comprising a plurality of layers, an input vector corresponding to a data item, wherein the plurality of layers comprise a layer associated with a mapping matrix;
generate a binary matrix based on the mapping matrix;
generate an output vector based on the input vector and a plurality of rows of the mapping matrix; and
determine, based on the output vector, that the data item is associated with one or more classes.

18. The system of claim 17, wherein the binary matrix is further generated based on an identity matrix and one or more Gaussian vectors and the processors are further operable when executing the instructions to:
generate an expansion matrix by concatenating the identity matrix and the one or more Gaussian vectors.

19. The system of claim 18, wherein the expansion matrix is associated with a hyper parameter, the hyper parameter being determined based on a trade-off between speed and accuracy of the neural network model.

20. The system of claim 18, wherein generating the binary matrix comprises:
multiplying the mapping matrix with the expansion matrix; and
applying a sign operation on the multiplication result.

* * * * *

UNITED STATES PATENT AND TRADEMARK OFFICE
CERTIFICATE OF CORRECTION

PATENT NO. : 11,720,789 B2
APPLICATION NO. : 16/672352
DATED : August 8, 2023
INVENTOR(S) : Hessam Bagherinezhad et al.

It is certified that error appears in the above-identified patent and that said Letters Patent is hereby corrected as shown below:

In the Claims

Column 18, Line 56 (Claim 1):
"comprise a last-"
Should read:
--comprise a--

Signed and Sealed this
Nineteenth Day of December, 2023

Katherine Kelly Vidal
*Director of the United States Patent and Trademark Office*